United States Patent

Barron

Patent Number: 5,720,529
Date of Patent: Feb. 24, 1998

[54] ROLLER SKATE WHEEL

[76] Inventor: Bruce J. Barron, 10A Geckler Rd., Portland, Me. 04103

[21] Appl. No.: 771,127

[22] Filed: Dec. 20, 1996

[51] Int. Cl.[6] .................................................. B60B 19/00
[52] U.S. Cl. ................................................ 301/5.23; 301/5.3
[58] Field of Search ................................ 301/1, 5.1, 5.23, 301/5.3, 5.7; 280/11.2, 11.22, 11.23, 11.19; 295/32; 16/18 R, 21, 24, 25, 26; 305/60

[56] References Cited

U.S. PATENT DOCUMENTS

| | | | |
|---|---|---|---|
| 595,087 | 12/1897 | Widders | 295/32 |
| 685,232 | 10/1901 | Conway | 295/32 |
| 1,305,535 | 6/1919 | Grabowiecki | |
| 1,355,910 | 10/1920 | Reinberger | 305/60 X |
| 3,253,632 | 5/1966 | Dalrymple | |
| 3,789,947 | 2/1974 | Blumrich | |
| 3,876,255 | 4/1975 | Ilon | |
| 4,076,263 | 2/1978 | Rand | 301/5.1 X |
| 4,335,899 | 6/1982 | Hiscock | |
| 4,715,460 | 12/1987 | Smith | |
| 5,246,238 | 9/1993 | Brown | |
| 5,312,165 | 5/1994 | Spletter | 301/5.23 X |
| 5,383,715 | 1/1995 | Homma et al. | |
| 5,549,331 | 8/1996 | Yun et al. | 16/26 X |

FOREIGN PATENT DOCUMENTS 384801  4/1922  Germany .................................. 16/21

*Primary Examiner*—Russell D. Stormer
*Attorney, Agent, or Firm*—Kennedy, Covington, Lobdell & Hickman, LLP

[57] ABSTRACT

A wheel for inline roller skates to allow oblique and lateral rolling movement includes an annular hub for mounting to axles associated with the roller skate with the hub having a circumferential groove formed thereabout with the groove being defined by curved wall members extending radially away from the central hub body and curving inwardly toward one another with a plurality of spherical roller elements fitted within the groove and extending circumferentially about the central hub body for free rolling movement within the groove with the roller elements being retained in place by the walls and being free to roll in any direction, thereby allowing a roller skater to experience oblique and lateral motion.

8 Claims, 4 Drawing Sheets

ROLLER SKATE WHEEL

BACKGROUND OF THE INVENTION

The present invention relates broadly to roller skates and, more particularly, to inline roller skate trucks and wheels.

Inline roller skates date back to at least 1898 yet their use is only now becoming increasingly more popular. Unlike conventional roller skates which mount side by side wheels which form two trucks for mounting at the heel and toe of the skate, inline skates include four to eight wheels mounted in a linear array along the under side of the skate. The notion is that the inline arrangement of the wheels more closely mimics an ice skate such that many skating maneuvers performed on ice can now be performed on pavement.

One of the maneuvers which cannot be performed with conventional inline roller skates is gliding sideways to a stop. In ice skating, a skater will often stop by thrusting the blades into an angular relation with the direction of skater movement and essentially skidding to a stop. This maneuver is not possible with conventional roller inline roller skates due to the amount of friction likely involved between the pavement and the wheels when the wheels would need to be moving sideways and contrary to forward movement which would allow smooth wheel rotation. Accordingly, an alternate method of stopping must be performed.

Other attempts have been made to provide inline skaters with the ability to move laterally with the skates out of alignment with the direction of skater motion. In Brown U.S. Pat. No. 5,264,238 this was accomplished by using a roller skate wheel having a plurality of roller elements which are formed in an essentially "dumb bell" manner with the inner portion of the dumb bell acting as an axle and the outer portions of the dumb bell acting as ground contact members. These rolling elements are disposed circumferentially about a wheel hub with the axles aligned with a forward direction of skater movement. Therefore, lateral rolling motion can be achieved. Due to the configuration of the rolling elements, the Brown wheels mount five such rolling elements about the circumference thereof. This leaves an unfortunate gap between each element which gives rise to forward motion which is less than smooth.

Another attempt at lateral motion in an inline roller skate appears in Spletter U.S. Pat. No. 5,312,165. There a roller skate wheel is formed with a plurality of disc elements arranged circumferentially about a hub with the disc elements each mounted to an axle for rolling movement thereabout. Accordingly, when a skater initiates lateral motion, the so-called slip discs of Spletter '165 rotate about their own axles and allow lateral movement. The Spletter wheels also include a spacing between each slip disc making the slip discs discrete rolling elements. Therefore, forward motion of skates equipped in accordance with Spletter '165 would experience smoother motion than Brown but improvement possibilities remains for smoothing out the forward motion in inline roller skates configured for lateral movement.

SUMMARY OF THE INVENTION

It is accordingly an object of the present invention to provide an inline roller skate wheel for use with a plurality of other like wheels which provides the skater with the ability to perform oblique and lateral rolling movements with transitions between rolling directions being smooth.

To that end, the wheels for inline roller skates to allow oblique and lateral rolling movement includes an annular hub for mounting to an axle associated with an inline roller skate, the hub having a disc-like central body and being formed with circumferential groove thereabout, the groove being defined by curved wall members extending radially outwardly from the central hub body with the walls curving inwardly toward one another, and a plurality of spherical roller elements fitted within the groove and extending circumferentially about the central hub body for free rolling movement within the groove, the roller elements being retained in place by the walls and being free to roll in any direction, thereby allowing a roller skater to experience oblique and lateral motion.

It is preferred that each of the roller elements defines a maximum diameter and the walls extend around the roller elements to a position beyond the maximum diameter to retain the roller elements within the groove. It is further preferred that the hub be formed with a plurality of depressions circumferentially disposed around the groove with each of the depressions being predisposed to receive a portion of a roller element therein to stabilize each roller element and to prevent the roller elements from traveling within the groove.

It is further preferred that the hub be formed in two mating portions with a first mating portion and second mating portion to allow placement of the roller elements within groove without deformation of the walls and the hub further includes an arrangement for retaining the first mating portion and the second mating portion in a mated hub forming relationship. Preferably, the means for retaining the first mating portion and second mating portion in a mated, hub forming relationship includes a threaded member projecting away from a mating surface of the first mating portion with a threaded recess formed in a mating surface of the second mating portion and configured for the receipt of the threaded member whereby the threaded member is fully received in the recess when the mating surfaces are in contact, thereby forming the hub. It is further preferred that the threaded member be formed with a threaded recess therein and the second hub portion includes a opening in registry with the recess when the mating surfaces are in contact for receiving a bolt therethrough for threaded engagement of the bolt with the threaded recess to assist in retaining the first mating portion and the second mating portion in a mated hub forming relationship.

Alternately, the arrangement for retaining the first mating portion and the second mating portion in a mated, hub forming relationship includes an arrangement for snap-fitting a portion of the first mating portion into a portion of the second mating portion.

Alternately, the hub may be formed as a one-piece unit with the walls being formed of resilient material to allow the roller elements to be pressed fitted within the groove.

By the above, the present invention provides a wheel for use with inline roller skates which allows both oblique and lateral rolling movement as well as forward rolling movement with transitions between rolling directions being smooth.

DESCRIPTION OF THE PREFERRED EMBODIMENT

Figure 1:
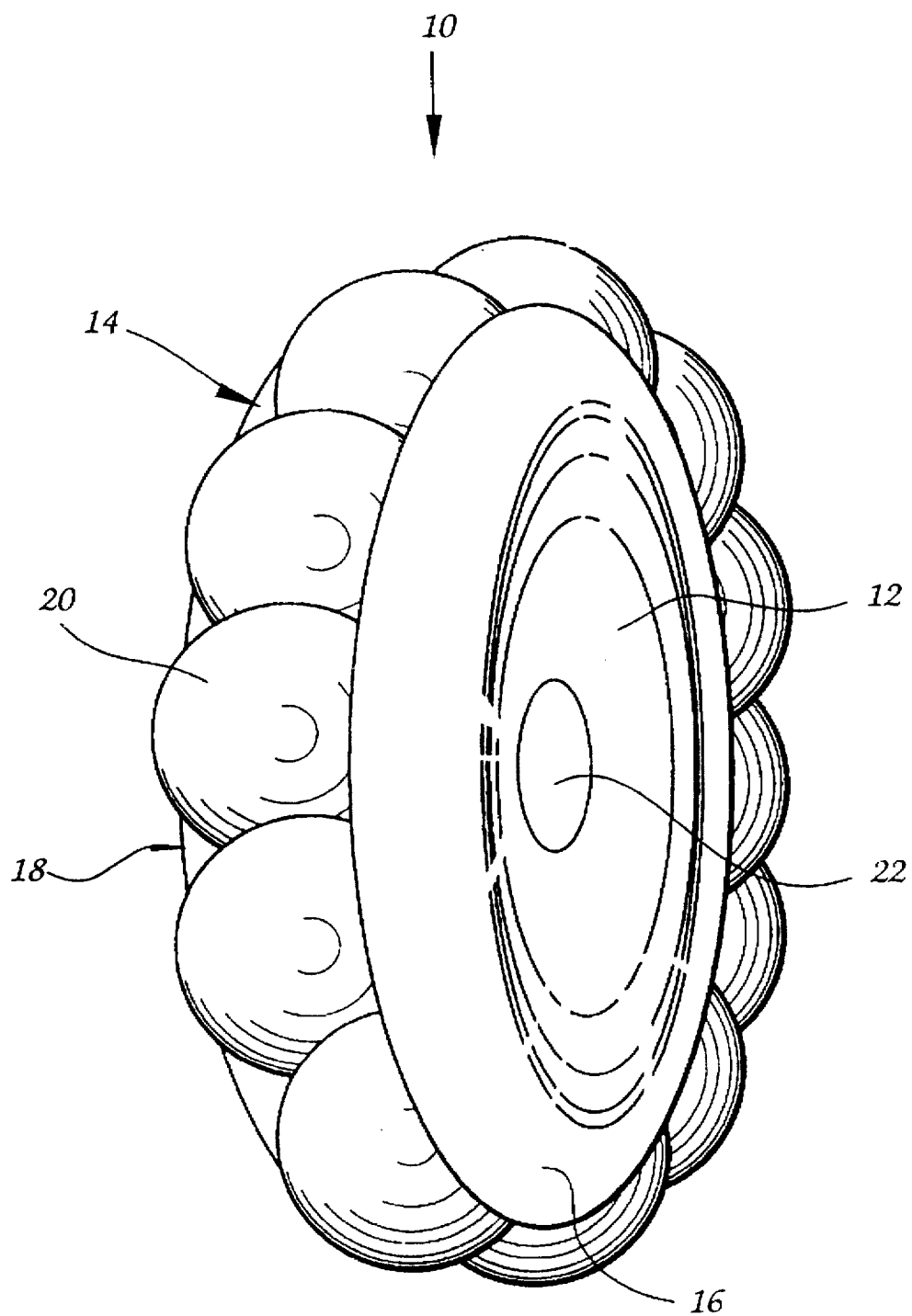
FIG. 1 is a perspective view of a wheel for use with inline skates in accordance with the preferred embodiment of the present invention.

Turning now the drawings and, more particularly to FIG. 1, a wheel for use with inline roller skates according to the preferred embodiment of the present invention is illustrated generally at 10 and includes an annular hub member 12 having a central axle opening 22 formed there through. The hub 12 includes two predefined side portions 16, 18 extending radially away from the axle opening 22. The lateral surface of each hub portion 16, 18 is contoured with the axle opening 22 being sunken in relation to the radially outermost portion of the hub 12. The contour provides room for bearings and enhances the appearance of the wheel 10, yet the contour need not be present to conform to the present invention. A groove 14 is circumferentially formed about the radially outermost surface of the hub 12 and is defined by two curved wall members 15 which extend outwardly from the central hub body 12 and curve inwardly toward one another prior their termination as will be seen in greater detail hereinafter.

It will be appreciated by those skilled in the art that there are a number of ways of constructing the wheel 10 in accordance with the present invention with the primary feature of the wheel being the use of spherical roller elements to allow smooth oblique and lateral rolling motion of skates equipped with wheels according the present invention. The hub 12 may be formed as a two-piece unit or a one-piece unit and there are at least two ways, both being illustrated herein, of mating the hub portion 16, 18 in order to achieve a solid wheel. These "manufacturing" versions will be explained in greater detail hereinafter, yet it is important to note that the primary advantages attained by one version or the other are achieved during manufacturing and are inconsequent to the operational performance of the wheel 10.

A plurality of spherical roller elements 20 which may be formed of nylon, steel or other material possessive of sufficient strength, are disposed circumferentially about the groove 14 and are held in place by the groove walls 15. The roller elements 20 are of uniform spherical size and dimension and are evenly distributed about the groove 14.

Figure 3:
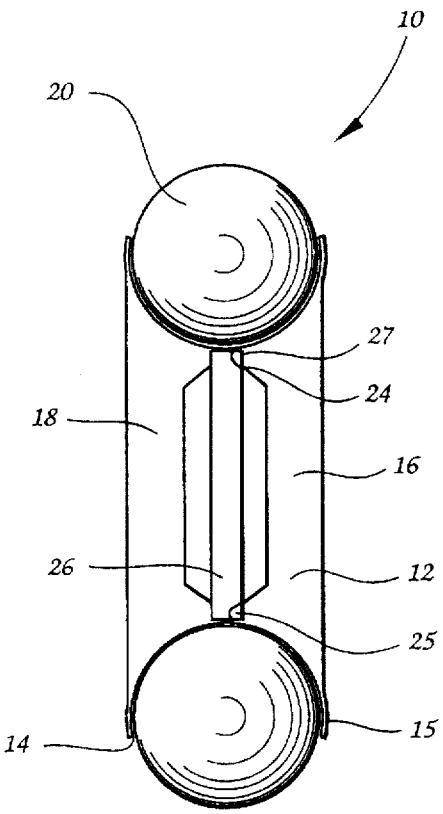
FIG. 3 is a side cross sectional view of the inline skate wheel taken through line 3—3 of FIG. 2.
Figure 5:
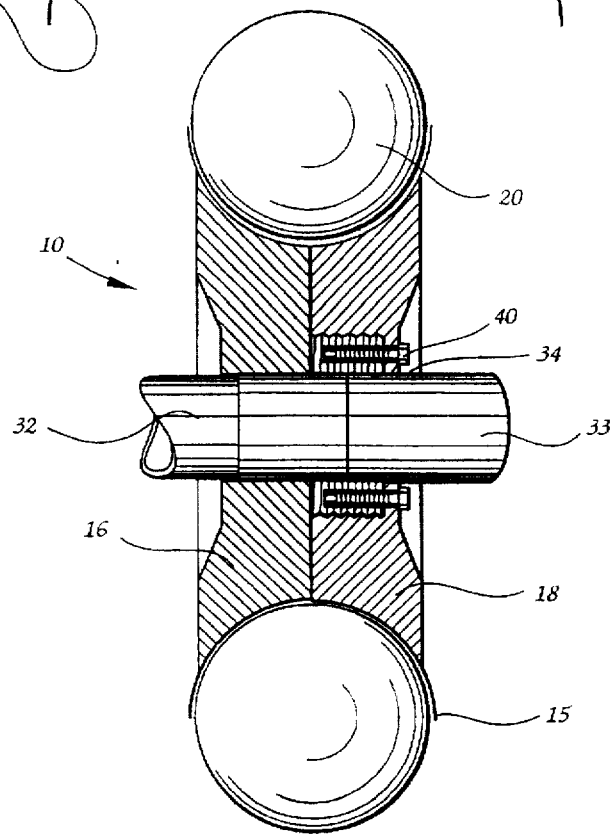
FIG. 5 is a side cross-sectional view of the wheel illustrated in FIG. 4.
Figure 7:
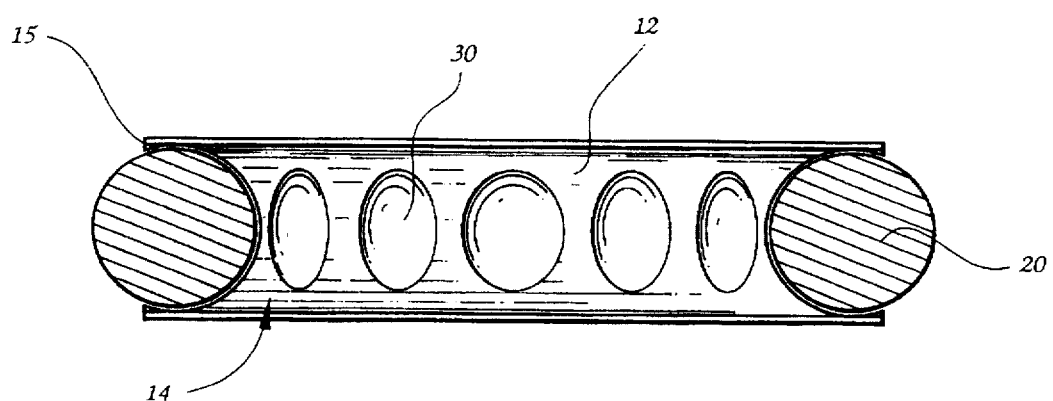
FIG. 7 is a side cut-away view taken through line 7—7 in FIG. 6.

As seen in FIGS. 3, 5 and 7, the cross-section of a sphere defines a circle and the cross-section of the groove 14 and wall 15 arrangement defines a portion of a circle. As may be expected, the curvature of the groove 14 and walls 15 mimics the curvature of the roller elements 20 with the mimicking curvature extending from the terminal of one Wall 15 across the groove 14 to the terminal of the other wall 15. Importantly, the extent of this curvature is greater than 180° which would be greater than the position of the greatest diameter achieved by any roller element. Accordingly, the walls 15 curve back toward one another in the area of curvature extending beyond 180° and thereby hold the roller elements 20 in place.

Figure 2:
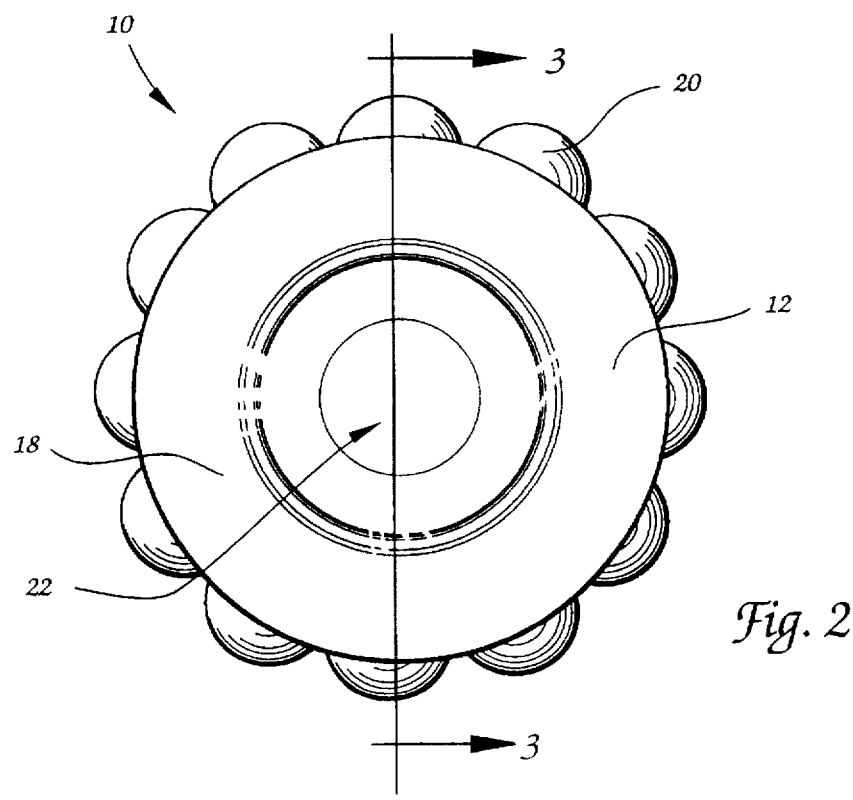
FIG. 2 is a side view of the wheel illustrated in FIG. 1.

The manufacturing problem associated with placing the roller elements 20 within the groove 14 gives rise to either a two piece construction or resilient walls 15 capable of bending sufficiently to allow insertion of the roller elements 20 while returning to their original configuration to hold the roller elements 20 in place within the groove 14.

one of the two-piece assemblies is illustrated in FIG. 2. There, each hub portion 16, 18 is fitted with one portion of a mating assembly. The second hub portion 18 includes a receiving recess 26 formed circumferentially around an inner portion of the hub inwardly of the groove 14. A rim like flange 27 extends annularly around the recess 26. A corresponding circularly, angularly oriented projection 24 is configured for mating within the recess 26. The annular projection 24 includes a barb 25 extending along select portions thereof wherein the mating of the hub portion 16, 18 causes the barb 25 to be displaced by the flange 27 with the resiliency of the material acting to return the barb 25 to its original position and be thereby retained in place by the flange 27. The press-fit type arrangement is the simplest two piece form of the present invention yet for competitive skates or other such uses of the wheel, a more positive, locking fit may be desirable.

Figure 4:
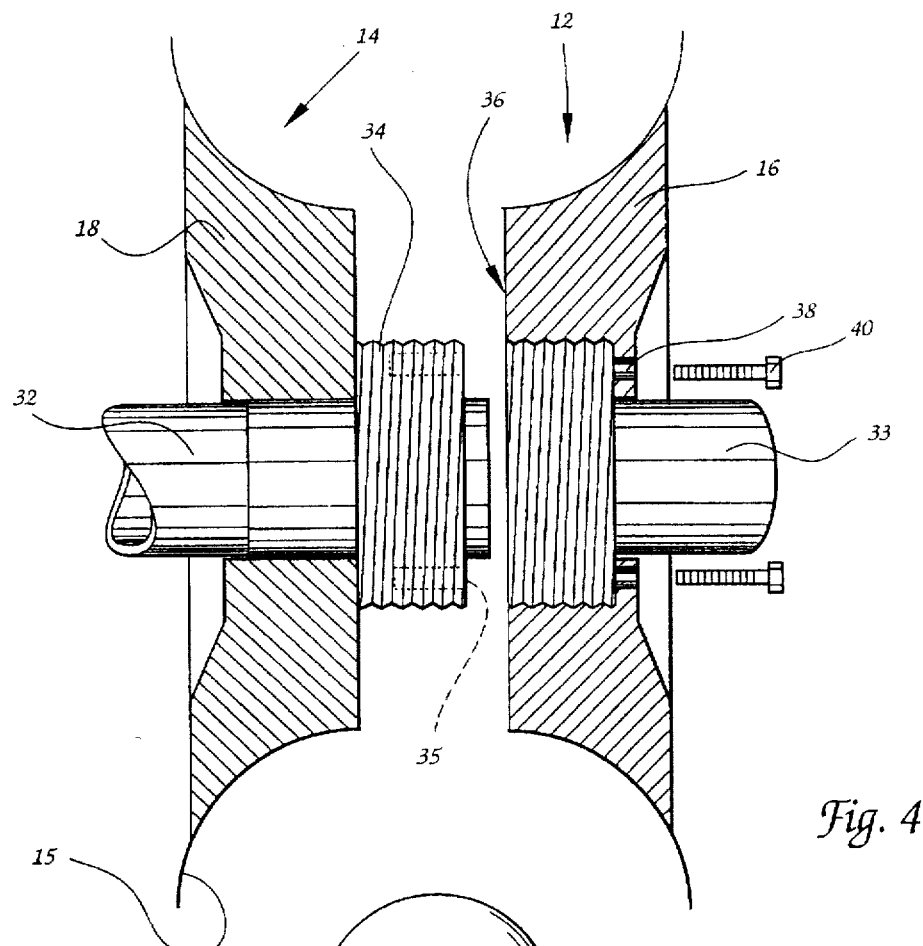
FIG. 4 is a cut-away, exploded view of a two piece hub according to one preferred embodiment of the present invention.

To that end, and with reference to FIGS. 4 and 5, a central axle 32 is fitted within a second hub portion 18 and projects outwardly therefrom. A threaded member 34 is fixed to the portion of the axle 32 which extends away from the second hub portion 18. The first hub portion 16 is formed with a threaded recess along with a second axle portion 33 projecting away from hub portion 16. In order to assemble the wheel, the roller elements 20 are positioned against one or the other hub portions 16, 18 and the first hub portion 16 is threadedly engaged with the threaded member 34 and rotated until the hub portion 16, 18 are in a mated relationship as illustrated in FIG. 5. In order to more fully secure the hub portions 16, 18 into engagement with one another, a pair of threaded openings 35 are formed within the threaded member 34. Bolt passage openings 38 are formed in the first hub portion 16 at a position to be in registry with the threaded openings 35 and the threaded member 34 when the hub portions 16, 18 are in a mated relations. Once this occurs, conventional bolts 40 may be inserted through the openings 38 into the threaded openings 35 and tightened down. Once this occurs, the wheel is in an assembled condition as seen in FIG. 5.

A third version of the present invention is illustrated in FIG. 7 wherein the hub 12 is formed as a single unit with the walls 15 being sufficiently resilient so that the roller elements 20 may be pressed fitted therein. The most obvious advantage to this version is that it is less expensive to produce than either of the other two version but some strength is given up in the wall members which must be sufficiently resilient to allow the press fitting of the roller elements 20.

So far, the three different versions of the present invention have been distinctive primarily from a manufacturing standpoint. There are two other versions of the present invention which affect the wheel 10 from a performance standpoint. It should be noted that these two versions which will be described in detail presently are not mutually exclusive from any of the other three versions previously described. In fact, any combination of the foregoing three versions may be used along with either of the two upcoming versions without limitation on any version of the wheel.

As seen in FIGS. 3 and 5, the roller elements 20 are freely disposed within the groove 14 so that they may both freely rotate in place and, as a group, the roller elements 20 may translate within the groove 14 around the circumferential path defined thereby. This version may have some performance characteristics which are heretofore unknown yet may make this version more desirable than the upcoming version. Nevertheless, it may be desirable to prevent such translatory motion of the roller elements 20 within the groove 14.

Figure 6:
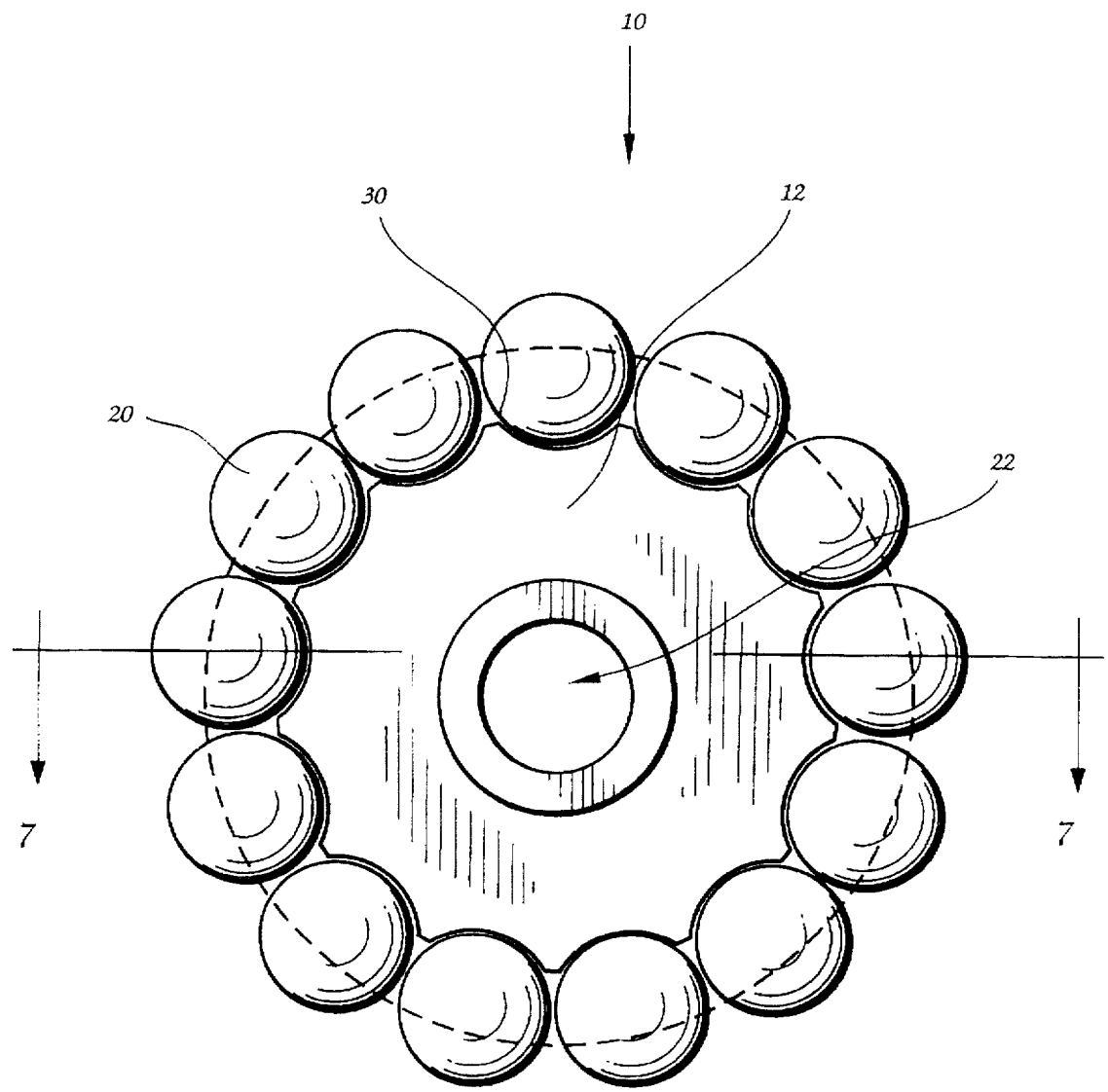
FIG. 6 is a side, open view of an alternate version of the wheel illustrated in FIG. 1.

To that end, a second performance version, as opposed to the second manufacturing version, of the present invention is illustrated in FIGS. 6 and 7. There, a plurality of depressions or indentations 30 are disposed around the circumference of the groove 14 and are predisposed at a position to accept a portion of a roller element 20 therewithin. As may be expected, the acceptance of that portion of the roller element 20 within the depression 30 acts to position and stabilized each roller element 20 such that any translatory motion of the roller elements 20 as a group is prohibited. This effect is more noticeable in FIG. 6 wherein the restraining effect created by the walls of the depression 30 in combination with the walls 15 forming groove 14 acts to keep each roller element 20 in its predefined position. Accordingly, no translatory motion of the roller elements 20 occurs and this version should provide more positive control for a skater.

In operation, the wheels 10 are mounted to a roller skate (not shown) in a linear array with the wheels 10 capable of rotational motion which carries the roller elements 20 thereabout. The roller elements 20 are also free to move under whatever influence they experience within their indentation 30 if the second performance version is chosen or the elements may freely move within the groove 14 under whatever influence is provided if the first performance version is chosen. In order to move laterally, the skater need only move his feet away from the direction of motion and the roller elements, since they are free to rotate in any direction, will allow oblique or lateral motion to occur. Friction between the roller elements 20 and the groove 14 along with the accompanying walls 15 will allow the skater to move laterally to a stop. Further, it is predicted that far more interesting skating maneuvers may be achieved by the skater since the free rolling motion of the spherical roller elements 12 will allow smooth and rapid directional changes.

By the above, the present invention provides an inline roller skate wheel which is capable of providing the skater with smooth oblique and lateral motion, allowing a sliding stop and allowing rapid and smooth directional changes.

It will therefore be readily understood by those persons skilled in the art that the present invention is susceptible of broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. A wheel for inline roller skates to allow oblique and lateral rolling movement, said wheel comprising:

an annular hub unit for mounting to an axle associated with an inline roller skate, said hub having a disk like central body and being formed with a circumferential groove thereabout, said groove being defined by curved wall members extending radially outwardly from said central hub body, with said walls curving inwardly toward one another, and;

a plurality of spherical roller elements fitted within said groove and extending circumferentially about said central hub body for free rolling movement within said groove, said roller elements being retained in place by said walls, with said roller elements being free to roll in any direction, thereby allowing a roller skater to experience oblique and lateral motion.

2. A wheel for inline roller skates according to claim 1 wherein each of said roller elements defines a maximum diameter and said walls extend around said roller elements to a position beyond said maximum diameter to retain said roller elements within said groove.

3. A wheel for inline roller skates according to claim 1 wherein said hub is formed with a plurality of depressions circumferentially disposed around said groove, each of said depressions being predisposed to receive a portion of a roller element therein to stabilize each said roller element and to prevent said roller elements from traveling within said groove.

4. A wheel for inline roller skates according to claim 1 wherein said hub is formed in two mating portions, including a first mating portion and a second mating portion to allow placement of said roller elements within said groove without deformation of said walls, and said hub further includes means for retaining said first mating portion and said second mating portion in a mated, hub forming relationship.

5. A wheel for inline roller skates according to claim 4 wherein said means for retaining said first mating portion and said second mating portion in a mated, hub forming relationship includes a threaded member projecting away from a mating surface of said first mating portion and said a threaded recess formed in a mating surface of said second mating portion and configured for receipt of said threaded member whereby said threaded member is fully received in said recess when said mating surfaces are in contact, thereby forming said hub.

6. A wheel for inline roller skates according to claim 5 wherein said threaded member is formed with a threaded recess therein and said second hub portion includes an opening in registry with said recess when said mating surfaces are in contact for receiving a bolt therethrough for threaded engagement of said bolt with said threaded recess to assist in retaining said first mating portion and said second mating portion in a mated, hub forming relationship.

7. A wheel for inline roller skates according to claim 4 wherein said means for retaining said first mating portion and said second mating portion in a mated, hub forming relationship includes means for snap fitting a portion of said first mating portion into a portion of said second mating portion.

8. A wheel for inline roller skates according to claim 1 wherein said walls are formed of resilient material to allow said roller elements to be press fitted within said groove.

* * * * *